United States Patent

[11] 3,571,908

| [72] | Inventor | Frank Joseph Pilia |
| | | Short Hills, N.J. |
| [21] | Appl. No. | 800,408 |
| [22] | Filed | Feb. 19, 1969 |
| [45] | Patented | Mar. 23, 1971 |
| [73] | Assignee | Union Carbide Corporation |
| | | New York, N.Y. |

[54] PIPELINE WELDING
3 Claims, 3 Drawing Figs.

[52] U.S. Cl................................................ 29/493,
29/464, 29/475, 29/497, 219/61, 228/15, 228/44, 228/50, 285/286

[51] Int. Cl.......................................................... B23k 5/22, B23k 31/02

[50] Field of Search........................................... 29/464,
475, 493, 491, 497; 269/287, 288; 285/286; 228/4, 5, 15, 44, 50; 219/61, 158, 161, 535

[56] References Cited
UNITED STATES PATENTS

| 1,774,530 | 9/1930 | Sheehan...................... | 269/287X |
| 2,399,815 | 5/1946 | Martin........................... | 29/493 |
| 2,959,661 | 11/1960 | Bothwell et al.............. | 219/535X |
| 3,414,950 | 12/1968 | Phariss......................... | 219/161X |
| 3,475,597 | 10/1969 | Desloge....................... | 219/535 |
| 3,512,229 | 5/1970 | Phariss......................... | 219/161X |

Primary Examiner—John F. Campbell
Assistant Examiner—Ronald J. Shore
Attorneys—Paul A. Rose, Thomas I. O'Brien and Dominic J. Terminello

ABSTRACT: A method for eliminating diameter mismatch between pipe sections to be welded by clamping the sections to be welded in a preheated clamp to cause expansion of the pipe sections to the inside diameter of the clamp. The clamp is designed to be stronger than the pipe sections to prevent overexpansion thereof.

INVENTOR
FRANK J. PILIA
BY
ATTORNEY

INVENTOR
FRANK J. PILIA
BY
ATTORNEY

PIPELINE WELDING

This this invention relates to a method for welding pipeline and more particularly to such a process wherein mismatch between the diameters of the pipe sections to be welded is substantially eliminated.

The field welding of circumferential joints in pipelines has many problems associated with the pipe dimensions and tolerances. One such problem concerns joint lineup. The basic deficiency in the present methods of internal lineup, with the root bead of the weld on the inside of the pipe, stems from the fact that as manufactured there is a difference in pipe-to-pipe diameters and pipe dimensions are referenced from the outside of the pipe.

Pipe fabrication tooling works from the outside of the pipe. Pipe expanders use external dies, pipe cutoff and edge preparation machines work from the outside of the pipe, pipe wall thickness tolerances are dimensioned from the outside of the pipe and pipe diameters are measured on the outside of the pipe. Yet when it comes to perform the most difficult and critical operation of circumferential welding, work has always been done from the inside of the pipe, where all of the tolerances have accumulated.

Traditionally pipe lineup clamps work from the inside of the pipe. Some clamps have enough power to take the ovality out of the smallest diameter pipe. Expansion of the lineup clamp stops when it reaches the diameter of the smaller of the two pipes. The larger pipe then produces mismatch depending upon its contour and specific diameter in relation to the diameter of the smaller pipe. Up until now, the wall thickness of the pipe has often been as much as 12 percent greater than necessary in order to compensate for the mismatch in diameter.

Accordingly, it is the main object of the invention to provide a pipeline welding process wherein the problem of diameter mismatch is substantially eliminated.

It is another object of the invention to provide a pipeline welding process wherein the weld proceeds from the outside of the pipe toward the inside of the pipe.

Yet another object is to provide such a process wherein the operator is located inside the pipe and the pipe itself acts as a protection against the elements during foul weather conditions.

These and other objects will either be pointed out or become apparent from the following description and drawings wherein FIG. 1 is a front elevation of a clamping device to be placed around the joint to be welded;

It has been discovered that preheated external clamping is capable of producing and maintaining lineup in mismatched pipe diameters. For example, it has been found that when a clamp preheated to 600° F. is placed around low alloy steel pipe, the clamp is capable of producing and maintaining lineup in the range from 0.005 inches to 0.010 inches with considerable ease, even with diameter mismatch in the range of 0.200 inches.

Figure 1:
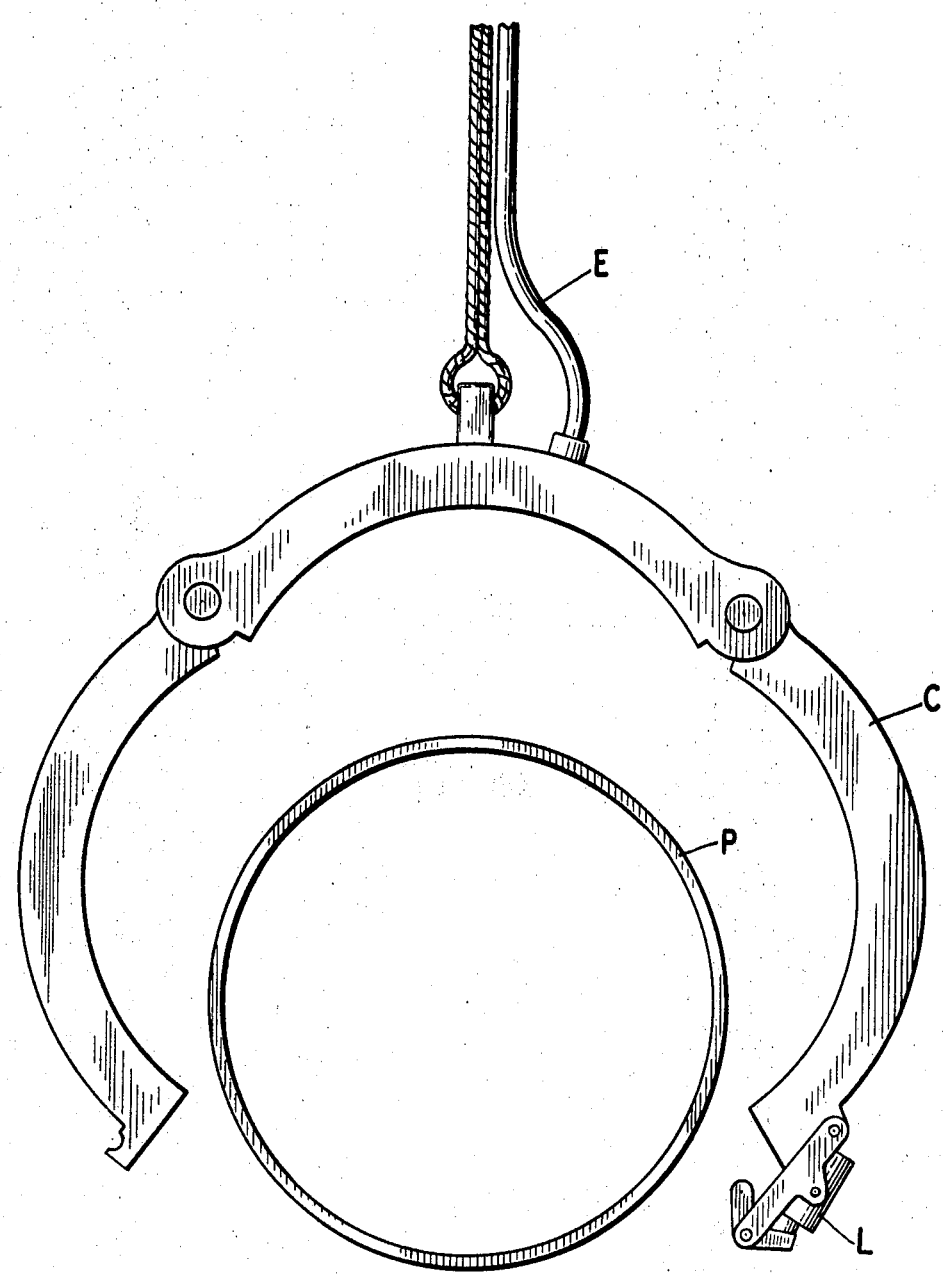
Figure 2:
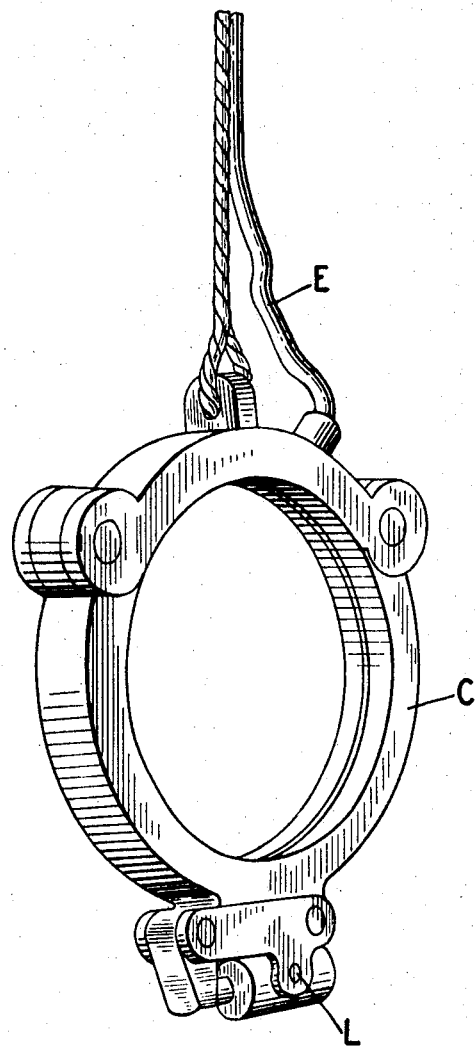
FIG. 2 is a prospective view of the clamp in the closed position.
Figure 3:
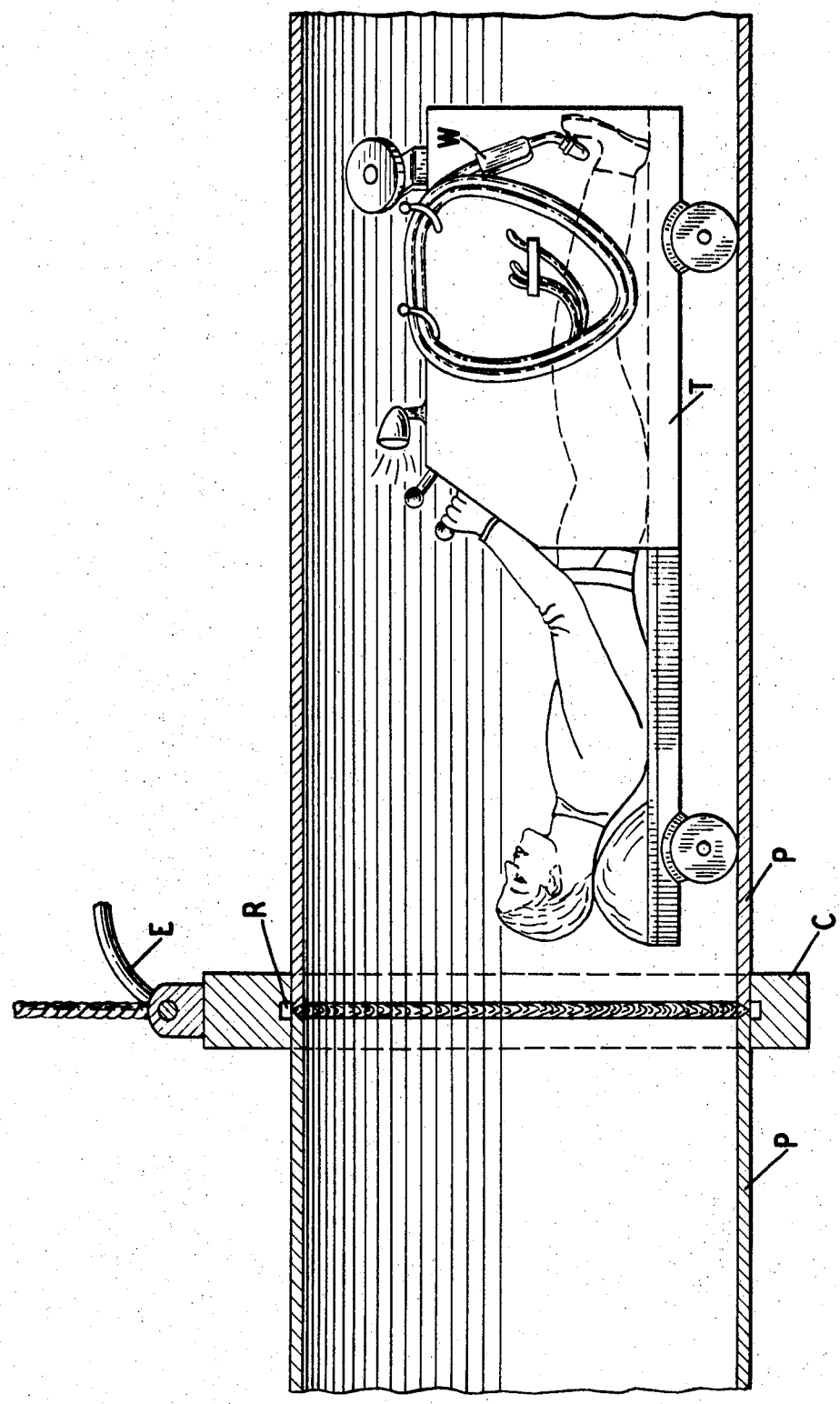
FIG. 3 is a cross-sectional view of a pipe to be welded showing the clamp in place and means by which an operator moves into position to make the weld.

This degree of control of lineup is brought about by the fact that the external lineup clamp C is placed around the outside of the pipe section P, see FIGS. 1 and 3, and locked for diameter by locking means L. The clamp C is heated by resistance heating elements located in the perimeter of the clamp and supplied with power brought to the clamp by electric cable E. As the heat from the clamp is transferred to the pipe sections, they expand driving the sections into intimate contact with the clamp E. Clamp C is designed to prevent further expansion of the pipe sections P once said sections come into contact with the interior surface of said clamp C. Differences in diameters are eliminated as the pipe sections expand to meet the clamp diameter. The weld is then made from the inside of the pipe sections as shown in FIG. 3. Pipe sizes above 24 inches in diameter are large enough to accommodate a man inside the pipe to produce the "Inside Out" weld. The pipe sections in FIG. 3 are larger sections in ranges of 36 to 42 inches in diameter. However, with suitable conventional mechanized welding equipment it is possible to use the present method of pipe lineup on pipe sections having diameters less than 24 inches. In FIG. 3, the pipe sections P have the clamp C in place. As can be seen, the clamp C has a relieve groove R in the area of the joint to be welded. A man on a transport carriage T carrying all the necessary welding equipment such as a welding torch W is moved into position to make the weld.

Welding from the "Inside Out" has many advantages. It is well known that the greatest percentage of weld defects are in the root of the weld. This method places the root on the outside of the pipe where the defects, if any, can be repaired without a weld cutout. An advantage of the present invention which necessarily follows is that root contour becomes noncritical. "Inside Out" welding will produce a smooth contour inside the pipe in the weld area eliminating the notch or step conditions prevalent with "Outside In" welding when mismatch is present or when poor root bead shape develops.

With external tooling, the preheat used to expand the pipe works to improve the lineup. On the other hand, preheat with internal tooling aggravates the lineup problem because the preheat and the heat from the weld combine to cause local expansion that moves the pipe away from the tooling. This results in a lack of control of the space relationship of the two edges of the pipe to be welded when using conventional welding methods.

This "Inside Out" method of welding frees the welder from the limiting effects of wind and weather, using the pipe as a shield. As a result, "Inside Out" welding can proceed without the use of an external portable house or shield as in the case of "Outside In" welding.

While the clamp has been described as being heated by resistance heating, the clamping may be heated by any suitable means such as flame or induction heating.

I claim:

1. A method for eliminating diameter mismatch between pipe sections to be welded comprising:
    bringing the sections to be welded together to form a joint;
    placing a preheated lineup clamp around the outside of the pipe sections to be welded to transfer heat to said pipe sections; and
    permitting the heated pipe sections to expand to meet the clamp diameter thereby eliminating any differences in diameter of the pipe sections an and assuring weld joint alignment.

2. A method for field welding a pipeline circumferential joint formed between two sections of pipe having a diameter of at least 24 inches comprising:
    bringing the sections to be welded together to form a joint;
    placing a preheated lineup clamp around the outside of the pipe sections to be welded to transfer heat to said pipe section;
    permitting the heated pipe sections to expand to meet the clamp diameter thereby eliminating any differences in diameter of the pipe sections and assuring weld joint alignment;
    entering the pipe sections and moving to the joint to be welded; and
    welding the pipe sections at the joint from the inside of said pipe sections whereby the root pass is placed at the outside of the pipe.

3. Method according to claim 2 wherein said clamp is preheated to at least 600° F.